United States Patent [19]

Beson

[11] Patent Number: 5,320,327
[45] Date of Patent: Jun. 14, 1994

[54] GATE VALVE

[75] Inventor: John Beson, Houston, Tex.

[73] Assignee: Foster Oilfield Equipment Company, Houston, Tex.

[21] Appl. No.: 798,448

[22] Filed: Nov. 26, 1991

Related U.S. Application Data

[63] Continuation of Ser. No. 685,219, Apr. 12, 1991, abandoned, which is a continuation of Ser. No. 493,045, Mar. 19, 1990, abandoned, which is a continuation of Ser. No. 189,574, May 8, 1988, abandoned, which is a continuation of Ser. No. 49,231, May 13, 1987, abandoned, which is a continuation of Ser. No. 659,614, Oct. 11, 1984, abandoned, which is a continuation-in-part of Ser. No. 551,589, Nov. 14, 1983, Pat. No. 4,566,671.

[51] Int. Cl.$^5$ .............................................. F16K 3/16
[52] U.S. Cl. ..................................... 251/172; 251/174
[58] Field of Search ..................... 251/172, 174, 210

[56] References Cited

U.S. PATENT DOCUMENTS

| 3,121,553 | 2/1964 | Grove | 251/328 X |
| 3,339,886 | 9/1967 | Grove | 251/328 X |
| 3,504,885 | 4/1970 | Hulsey | 251/328 X |

Primary Examiner—Martin P. Schwadron
Attorney, Agent, or Firm—David M. Ostfeld

[57] ABSTRACT

A gate valve [10] is disclosed having a secondary seal, wherein the gate [15] forms a metal to metal seal with the seat [29, 134] and wherein a resilient seal [36a] is moved toward the gate [15] in a closed position to form a secondary fluid-tight seal with the gate [15]. A device [31, 34] for deenergizing the secondary seal is provided in order to prevent wear of the secondary seal upon opening of the gate and also to reduce the gate [15] drag caused by the energized secondary seal. Also disclosed is a pressure relief mechanism [40, 141] for the secondary seal adapted to prevent damage to the seal and a mechanism for evenly applying opposing secondary seals.

13 Claims, 10 Drawing Sheets

GATE VALVE

This is a continuation of application Ser. No. 685,219, filed Apr. 12, 1991, now abandoned which is a continuation of application Ser. No. 493,045, filed Mar. 12, 1990, now abandoned which is a continuation of application Ser. No. 189,574, filed May 8, 1988, now abandoned which is a continuation of application Ser. No. 049,231, filed May 13, 1987, now abandoned which is a continuation of application Ser. No. 659,614, filed Oct. 11, 1984, now abandoned which is a continuation-in-part of application Ser. No. 551,589, filed Nov. 14, 1983 U.S. Pat. No. 4,566,671.

TECHNICAL FIELD

The present invention relates to gate valves and, more specifically, it relates to gate valves having a secondary seal.

BACKGROUND OF THE INVENTION

Gate valves have been commonly used for many years and have been employed in a variety of services such as in the oil and/or gas services of the petroleum industry. However, such valves have been designed for service involving pressures of only several thousand pounds per square inch. Today due to the depleted energy supply it has become necessary to explore and produce oil and gas under very high pressures of the range 30,000 psi (pounds per square inch) or more. Such high pressures have required greater sealing capacity and better safety features in such valves.

Prior art gate valves generally consist of a valve body having inlet and outlet conduits with a chamber therebetween. A gate having an opening therethrough is disposed in a valve seat mounted within the chamber and the gate is mounted on a stem. The chamber is closed by a bonnet affixed to the valve housing. The stem reciprocates within the bonnet and is attached to a reciprocating apparatus for moving the gate between a closed position in which flow is blocked through the conduits and an open position in which flow is allowed through the conduits and the gate opening. Such a valve is illustrated in U.S. Pat. Nos. 3,538,938 and 3,696,831.

It is also well known to seal between the valve seat and the valve housing by using an o-ring as shown in U.S. Pat. Nos. 2,957,492 and 3,348,567 and non extrusion seals as shown in U.S. Pat. No. 4,264,054. Further in automatic pressure sealed gate valves shown in U.S. Pat. Nos. 3,095,604; 3,538,938; and 3,696,831, fluent sealant rings are disposed around the valve seats to provide sealing between the valve housing and valve seats in response to line pressure on fluent sealant reservoirs in communication with the fluent sealant rings, and o-rings are installed on each side of the fluent sealant rings to isolate the fluent sealant in the fluent sealant rings from contamination by line fluids. This same principle is used for seals in wellheads as shown in U.S. Pat. No. 2,952,479. It is also known to locate an o-ring seal on the end of the gate seat as shown in U.S. Pat. No. 3,696,831. U.S. Pat. Nos. 3,057,630 and 3,758,072 teach combining an elastomeric O-ring and a polyflouroethylene polymer such as the brand "Teflon" or "nylon" or other low-friction plastic ring to make a seal ring. Further U.S. Pat. No. 3,103,366 teaches a deformable metal ring, as for example of aluminum, with an inner deformable plastic ring of polytetrafluororoethylene whereby the metal ring can adapt itself to slightly varying recess clearances and prevent the plastic ring from extruding through the clearances under pressure.

Two piece seats are also known in the art for floating seats as shown by brochures of Model 20 gate valves of FMC, and for replaceable seals through non metallic inserts to seats of Seaboard as shown by its brochure and U.S. Pat Nos. 4,376,526 and 4,124,194. Another replaceable seal in seats is shown by U.S. Pat. No. 4,163,544. A floating seat with a replaceable seal support element is shown by U.S. Pat. No. 3,273,855.

Secondary seals where the gate forms a metal-to-metal seal with the seat and where a resilient seal is moved toward the gate when the gate is in the closed position to form a secondary fluid-tight seal with the gate is shown by U.S. Pat. No. 4,377,273. Manual operations for removal of flow blocking plates and primary seal actuation after such removal are shown in U.S. Pat. No. 2,203,989. Sliding seals are shown in U.S. Pat. No. 2,471,941. Other valve seals are shown by U.S. Pat. Nos. 3,472,270, 2,134,277, 2,776,813, 1,692,496 and 3,557,822.

As discussed in U.S. Pat. No. 4,377,273, one problem frequently encountered in the case of gate valves is the lack of formation of adequate seals between the gate or gates and the seat or seats. In turn, if a seal is inadequate, the gate valves are often prone to leak through the seal. In U.S. Pat. No. 4,377,273, an invention is disclosed which seeks to provide an adequate seal for gate valves in the form of a positive bidirectional cam actuated and deactuated resilient secondary fluid seal.

While the invention described in U.S. Pat. No. 4,377,273 is believed to be advantageous for many applications, it has been found that there are applications in which other secondary seals may be provided. In particular, in high pressure situations wherein the formation of the secondary seal causes a significant pressure differential on the two sides of the gate and wherein the secondary seal is located on the downstream side, it has been found that for some applications, the drag on the secondary seal caused by movement of the gate to open when the secondary seal is fully effected may exaggerate the wear of the secondary seal. The additional drag on the gate also increases the effort required to open the valve. It is desirable in those instances to be able to deenergize or release the secondary seal prior to substantial linear movement of the gate across the seal.

In this regard, it is not necessary to totally withdraw the seal from the gate, but rather it is desirable to relieve the full pressure of the seal against the gate, or "deenergize" the seal, such that the pressure of the fluid moving through the valve will flow between the seal and the gate to preclude wear.

Additionally, in some high pressure situations wherein the secondary seal is fully effected or energized with no pressure in the valve body, and pressure is thereafter applied from the upstream side, there is no way for the fluid to enter into the body without leaking past the energized upstream secondary seal. Since the upstream secondary seal is mechanically energized, it is maintained until the pressure load of the fluid overcomes the mechanical load. In some instances, the pressure of the fluid is great enough to blow past the seal once it overcomes the mechanical energy of the seal, thereby damaging the resilient sealing ring contained in the seal.

It is therefore desirable to provide a pressure relief means from a secondary seal subjected to such pressurized fluid under the above conditions, in which the fluid will force the seal away from the gate and allow movement of the fluid past the seal without damaging the resilient seal element when the pressure of the fluid reaches a selected value.

Also, seats that are press fitted into the valve body are difficult to replace, particularly in the field. Special tools are required to overcome the press fit and the valve body counterbore is subject to damage by gaulling between the seat OD and valve body counterbore during installation and removal of the seat. It is desirable to provide a seat that can be replaced easily without disturbing the press fit between the seat and the body.

SUMMARY OF THE INVENTION

The present invention provides a means for providing pressure relief through the inclusion of a spring member between a resilient secondary seal and the seal supporting ring. The spring member has a selected spring constant chosen such that the spring will yield to allow fluid past the secondary seal when the pressure is sufficient to exert a selected force upon the seal ring.

The means for deenergizing the secondary seal prior to substantial linear movement of the gate may be effected in several ways. In one, the seal may be quickly deenergized through the provision of a elastomeric seal ring disposed between the seal support ring and the resilient seal member such that movement of the seal support ring causes immediate lessening of the pressure on the secondary seal and the loss of the seal on the secondary seal because of the expansion and elasticity provided by the compressed elastomeric seal member. In another approach, the seal may be deenergized through means of a floating wedge slidably mounted to the gate such that the wedge is adapted for movement to release the seal prior to movement of the gate. Each of these designs, therefore, effectively takes pressure off the resilient seal member of the secondary seal before substantial movement, or in the case of the wedge, before any movement of the gate across secondary seal.

The means for providing a seat that is easily replaced without disturbing the original press fit between the seat OD and the valve body is effected by providing a three piece split seat consisting of a seat body member press fit to the valve body, a seat face member which is threaded onto the seat body member, and a resilient seal ring sealing between the seat body member and seat face member. Should any damage occur to the seat face, which is not uncommon in oilfield installations, the seat face member can easily be replaced by screwing it off from the seat body member and a new one screwed on. In this manner, the press fit of the seat body member with the valve body is not disturbed. A new seal ring between the seat body member and the seat face ring can also be installed when replacing the seat face ring.

More specifically, the present invention includes a gate valve comprising a valve body having a valve chamber therewithin and a pair of flow passages through the valve body aligned at opposite sides of the valve chamber. The valve body further has a recess around the inner end of each of the aligned flow passages with a seat member disposed therein. A ring shaped seat member is disposed in each recess around the inner end of the flow passages and a secondary seat member is slidably disposed around at least one of the ring shaped seat members. In one embodiment, the secondary seal member comprises a ring shaped support element including portions extending along opposite sides of the gate. A seal means is supported by the ring shaped support element facing the gate. The gate valve further includes cooperating cam means associated with the gate and with the ring-shaped support element for moving the ring-shaped support element toward the gate when the gate is moved toward the closed position to form a secondary seal between the secondary seal member and the gate, and for deenergizing the secondary seal prior to substantial movement of the gate toward an open position.

In an embodiment of the present invention, the cooperating cam means includes a caming edge disposed along opposite sides of the gate. A pin follower is carried by each extended portion and adapted to engage with and follow the caming edge. An energizing ring is disposed between the ring-shaped support element and the seal means. A compressible elastomeric seal ring is disposed between the energizing ring and the seal means such that movement of the ring-shaped support element forces the energizing ring against the compressible elastomeric seal ring to form the secondary seal upon closing and such that the slight movement of the ring-shaped support element away from the gate allows the energizing ring to be forced outwardly by the compressible, elastomeric seal ring to deenergize the seal between the seal means and the gate.

In another embodiment of the present invention, the valve further comprises a spring member having a selected spring constant positioned between the energizing ring and the ring-shaped support element such that the spring member is adapted to provide pressure relief for the seal means when a selected pressure level is reached.

In yet another embodiment of the present invention, the elastomeric seal ring is an O-ring comprised of elastomeric material. Additionally, the spring member may be comprised of a belleville spring of a selected spring constant.

In yet another embodiment of the present invention, the elastomeric seal ring comprises elastomeric material which includes an anti-extrusion member. Additionally, the spring member may be comprised of a belleville spring of a selected spring constant.

In yet another alternative embodiment of the present invention, the cooperating cam means includes a caming wedge slidably mounted along opposite sides of the gate with clearance between the caming wedge and the gate to allow the gate to freely float with respect to the wedge. The wedge includes a caming edge surface. The extended portion of the ring-shaped support element includes a pin follower carried thereon and adapted to engage with the caming edge surface of the caming wedge. Hence, the caming wedge provides for the caming action while allowing the gate to freely float within the limits of the clearance between the wedge and the gate.

In yet another alternative embodiment of the present invention, the cooperating cam means includes a caming wedge slidably mounted along opposite sides of the gate such that movement of the wedge is effected prior to movement of the gate upon opening of the gate. The wedge includes a caming edge surface. The extended portion of the ring-shaped support element includes a pin follower carried thereon and adapted to engage with the caming edge surface of the caming wedge. Hence, the caming wedge provides for lost motion during the opening of the valve during which the wedge releases and deenergizes the secondary seal prior to movement of the gate to open the valve. It is to be noted however, that this embodiment is not appropriate in balanced stem valve cases in liquid service and is not preferred in balanced stem valve cases in gas service.

In a preferred aspect of some of the alternative embodiments of the present invention, the gate valve further includes a spring member having a selected spring constant wherein the spring member is positioned between the ring-shaped support element and the seal means in order to provide pressure relief for the seal means.

In yet another alternative embodiment of the present invention, the present invention includes a gate valve comprising a valve body having a valve chamber therein and a pair of flow passages aligned at opposite sides of the valve chamber. A recess is disposed around the inner end of each of the aligned flow passages in the valve body. A gate member having an imperforate section and a section having a flow passage therethrough is disposed within the valve chamber and is reciprocably movable along a line substantially transverse to the valve chamber flow passages between a gate position in which the valve is open and the flow passage of the gate member aligns with the valve chamber flow passages, and a gate position in which the valve is closed and the imperforate section aligns with the valve chamber flow passages. A valve seat is disposed in each of the recesses around the inner end of the flow passages. At least one of the valve seats comprises a ring-shaped seat against which the gate member slides between the open and closed positions such that the gate forms a primary seal with the ring-shaped seat when the gate is in the valve closed position. A seal support ring is slidably disposed around the ring shaped valve seat. The seal support ring has an inner recess therearound at the end adjacent the gate. An elastomeric seal member is disposed in the inner recess of the seal support ring and a spring member having a selected spring constant is positioned between the seal support ring and the elastomeric seal member such that the spring member provides pressure relief for the elastomeric seal member. The gate valve further includes a means associated with the seal support ring and the gate for drawing the seal support ring toward the gate when the gate is moved from the valve open position toward the valve closed position to force the elastomeric seal into sealing engagement with the gate after the gate has reached the closed position to form a secondary seal after formation of the primary seal. In a preferred aspect of this embodiment, the spring member is a belleville spring having a selected spring constant.

Accordingly, the present invention provides a means for quickly deenergizing the secondary seal through either a compressible elastomeric seal ring disposed between the secondary seal member and the ring-shaped seal support member wherein the decompression or elastic return of the seal ring "deenergizes" or relieves the secondary seal, or through means of a floating wedge adapted for movement prior to movement of the gate across the secondary seal or other suitable means. The present invention also provides a spring pressure relief means for preventing damage to the seal from pressurized fluid on the upstream side once a selected pressure level is reached on the seal.

In yet another simplified alternative embodiment of the present invention designed to simplify and reduce the cost of the secondary seal assembly, the secondary seal assembly consists of a seal ring carrier, a face seal ring, and a seat OD seal ring. Sealing contact between the secondary seal assembly and the gate is maintained by a spring means preferably a belleville spring.

A preferred embodiment of the simplified secondary seal assembly provides gate guides as an integral part of the seal assembly.

BRIEF DESCRIPTION OF THE DRAWINGS

These and other advantages of the present invention will further be illustrated by reference to the appended drawings which illustrate particular embodiments of a gate valve constructed in accordance with the present invention and in which like parts are given like reference numerals, and wherein.

DETAILED DESCRIPTION OF THE EMBODIMENTS

Specific embodiments of a gate valve are illustrated which will accommodate the use of a secondary seal assembly. The gate valves illustrated are of a rising stem style similar to that shown in U.S. Pat. No. 4,377,273, which is incorporated herein by reference. It will become apparent to those skilled in the art in view of the above and below disclosure that the present invention could be similarly utilized with solid gate valves, split gate valves, balanced stem valves, or non-rising stem valves and other valves which use seats and seals that are not gate valves.

Figure 1:
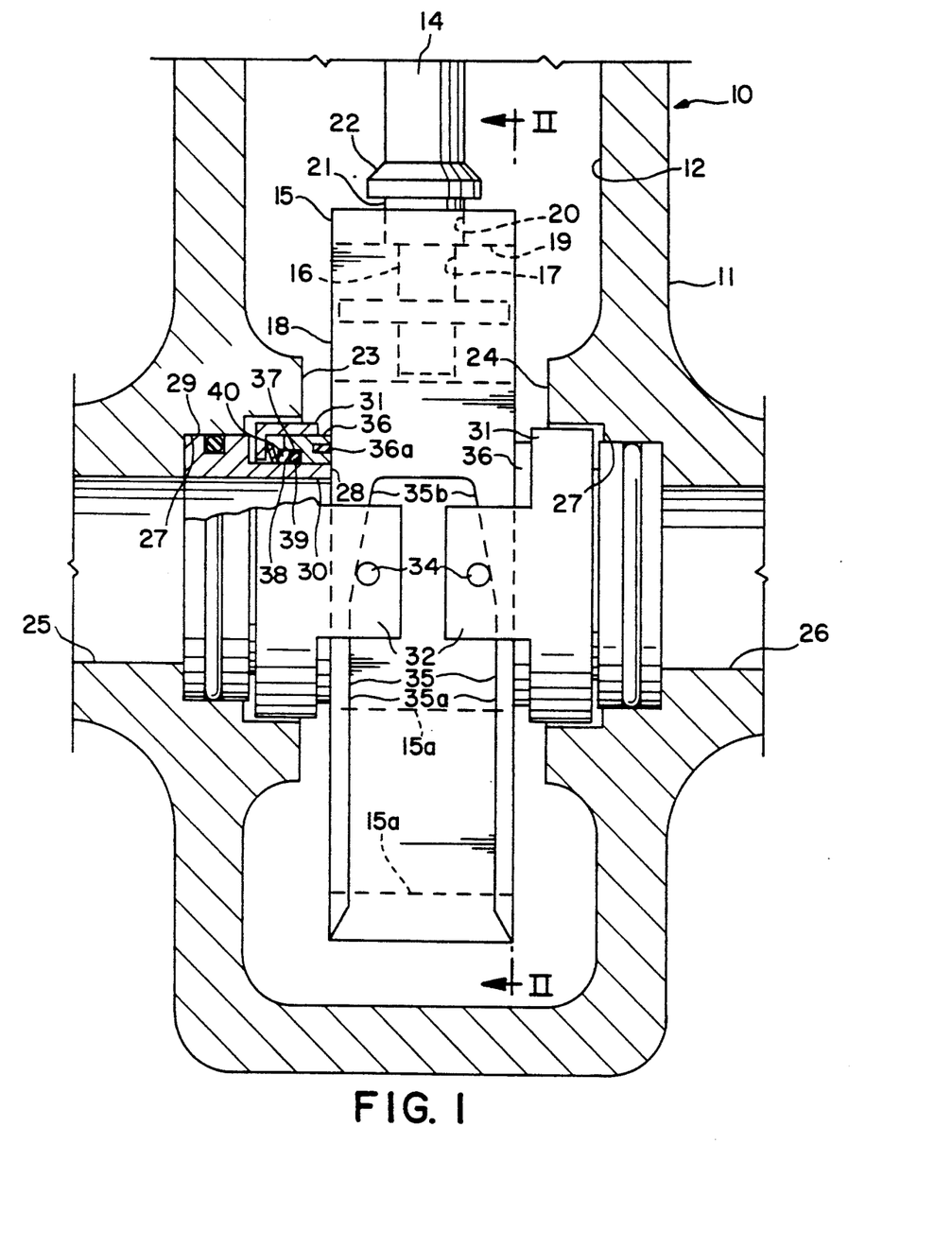
FIG. 1 is a vertical axial cross section illustrating a preferred embodiment of a gate valve constructed in accordance with the present invention.
Figure 8A:
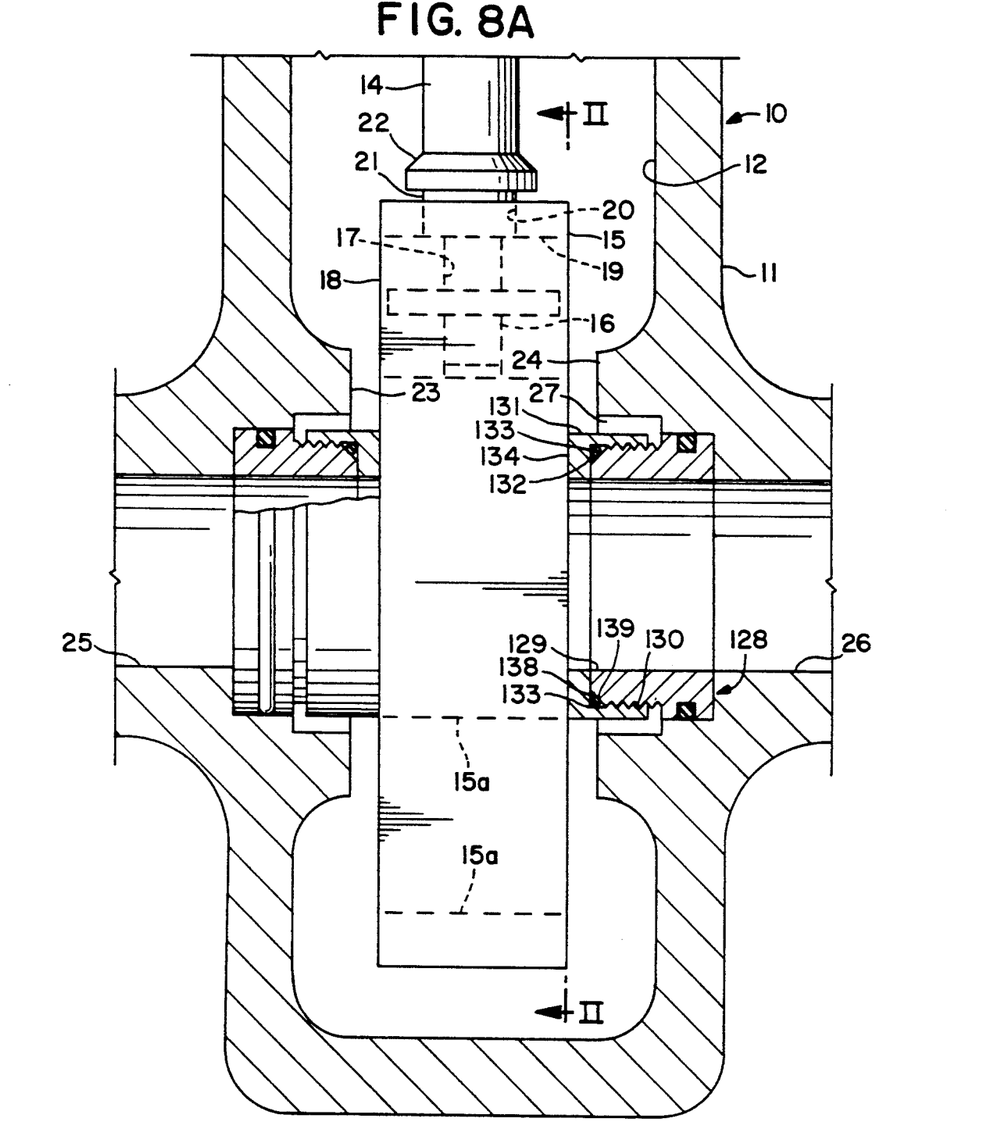
FIG. 8A is a vertical axial cross section illustrating an embodiment of a gate valve constructed in accordance with the present invention.
Figure 9A:
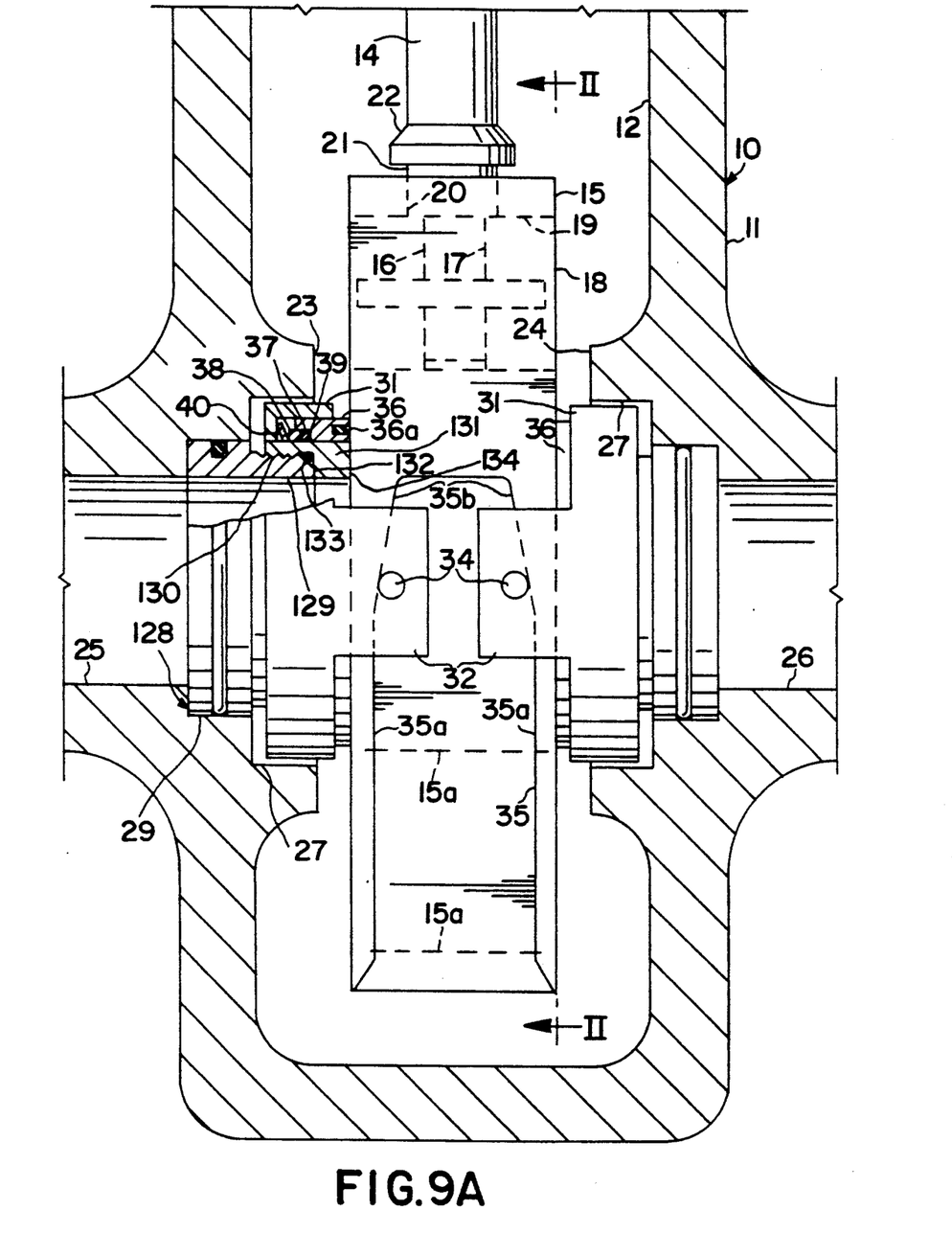
FIG. 9A is a vertical axial cross section illustrating another preferred embodiment of a gate valve constructed in accordance with the present invention.

Referring to FIGS. 1 and 8A and 9A, the gate valve 10 includes a valve body 11 which is hollow, having a valve chamber 12 therewithin. The upper or bonnet portion of the valve (not shown) may comprise a bonnet of any conventional form which provides a closure of the upper end of the chamber 12 and forms a seal between the valve body 11 and a stem 14.

The valve 10 includes a gate element 15 disposed within the chamber 12. The gate 15 has, generally, surfaces rectangular in section and is interconnected at the top with the stem 14. The stem 14 is adapted to raise and lower the gate 15 upon the selective movement of the stem 14.

Referring still to FIGS. 1, and 8A and 9A, the lower end of the stem 14 may take the form of a threaded stud 16 which is screwed and pinned into a tapped diametric opening 17 of a cylinder 18 which is received within a cylindrical opening 19 of the gate 15. The threaded stud 16 is connected to a cylindrical portion 21 of the stem 14 which is in turn received into an opening 20 of the gate 15. An upward conical formation 22 is formed around the stem 14 above the cylindrical portion 21 to provide a stop to prevent excessive upward movement of the stem by contact of formation 22 with the underside of the bonnet (not shown).

Vertical movement of the stem may be provided in a variety of manners. In the embodiment illustrated, the stem 14 may typically have threaded engagement with a yoke nut (not shown), so that rotation of the nut causes longitudinal movements of the stem 14 and the gate 15 in either direction.

It will be appreciated by those of skill in the art that these and other suitable means for attaching the stem 14 to the gate 15 may be utilized in accordance with the present invention.

Referring again to FIGS. 1 and 8A and 9A, two opposite formations 23, 24 project into the chamber 12 of the valve 10 around the inner ends of the opposed aligned flow passages 25, 26 of the valve body 11. The gate 15 has a flowport 15a therethrough which is positioned such that when the gate is moved upwardly in FIGS. 1 and 8A and 9A to be opened, the flow port 15a aligns with passages 25 and 26.

Figure 2:
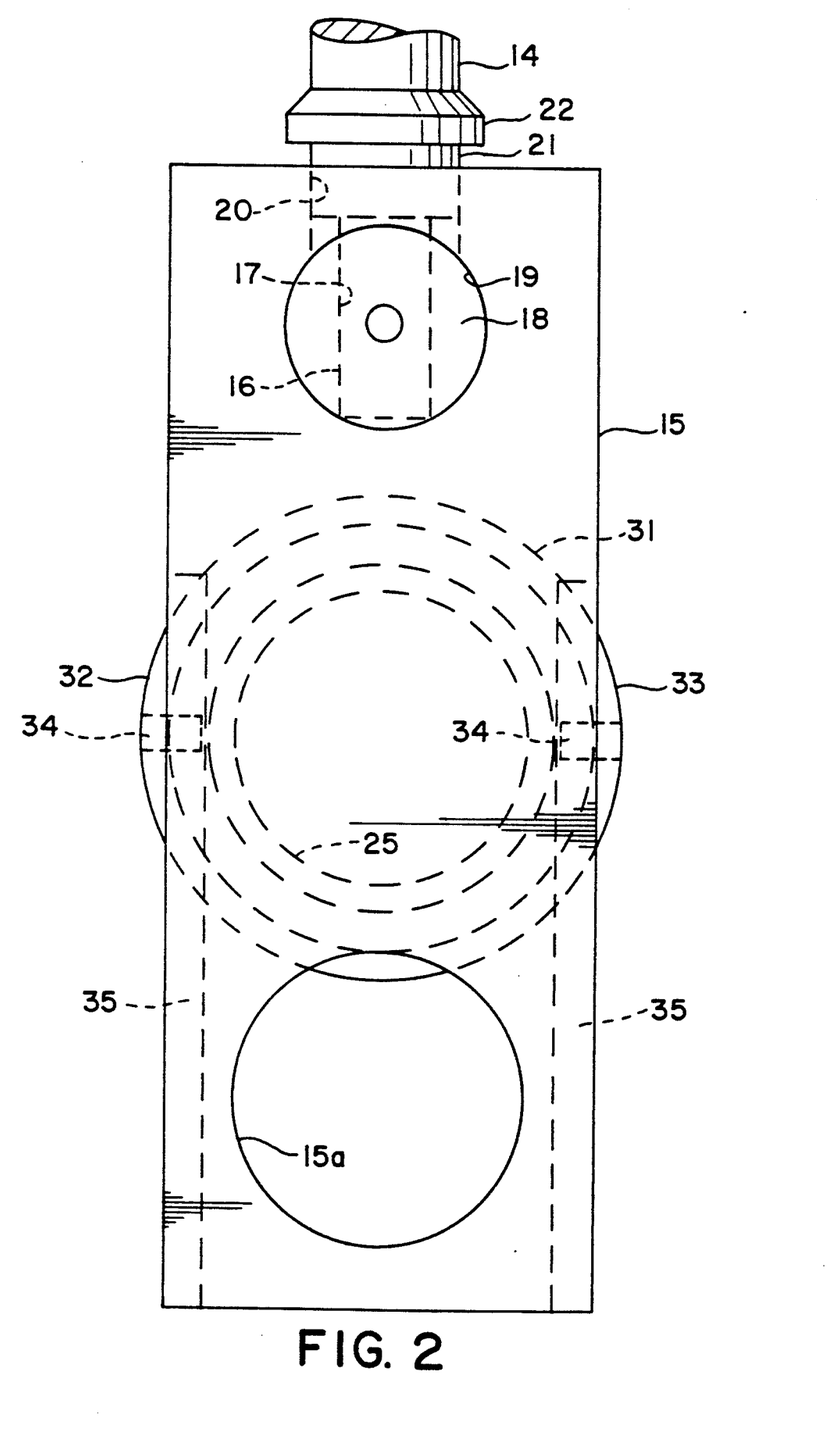
FIG. 2 is a vertical cross section taken at line II—II of FIGS. 1 or 8A.
Figure 3:
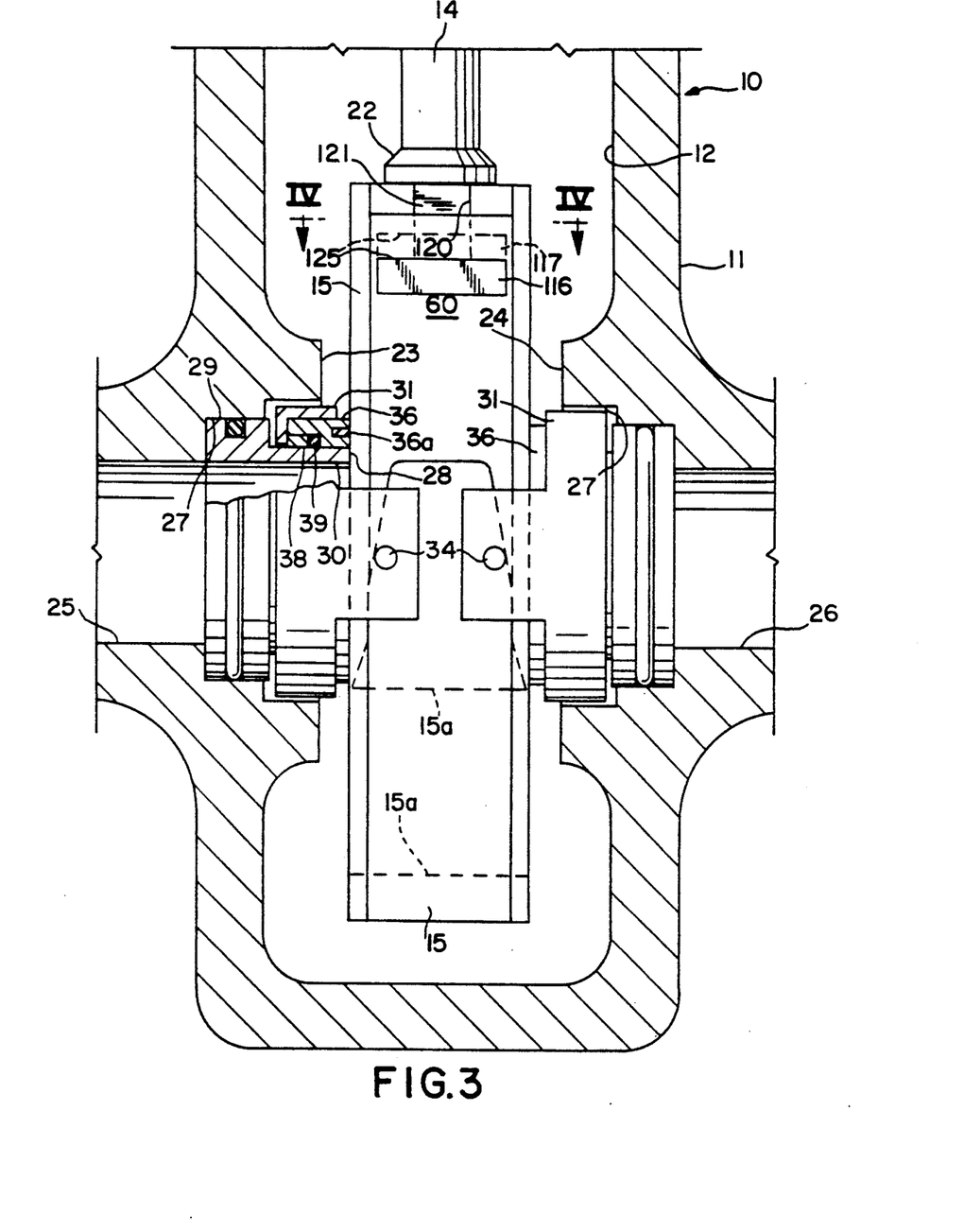
FIG. 3 is a vertical axial cross section illustrating an alternative preferred embodiment of the gate valve incorporating the caming wedge in accordance with the present invention.

A stepped annular recess 27 is formed around each of the flow passages 25, 26 concentrically into formations 23, 24. In the embodiment of FIGS. 1-3, a valve seat member 28 having an outwardly enlarged portion 29 is mounted in the bottom of the recess 27. In the embodiments of FIGS. 8A, 8B, 9A, 9B, 9C, 9D, a valve seat body member 128 is mounted in the bottom part of recess 27.

Referring to FIG. 8A, seat body member 128 includes tubular portion 129 and ring shaped seat face member 131, with threaded outside diameter 130 of portion 129 threadingly engaging ring shaped seat face member 131. The inner face of seat face member 131 engages and abuts the outer end face 132 of the tubular portion 129 of seat body member 128 creating a metal-to-metal seal along surface 132. Resilient seal member 133 is disposed in annular opening 138 between tubular portion 129 and seat face member 131 to create a secondary seal between tubular portion 129 and seat face member 131. Annular opening 138 formed by frusto-conical surface 139 at the upper, inner end of tubular portion 129. Outer face 134 of seat face member 131 engages gate 15 creating a metal-to-metal seal between seat face member 131 and gate 15 along the surface of face 134.

Figure 8B:
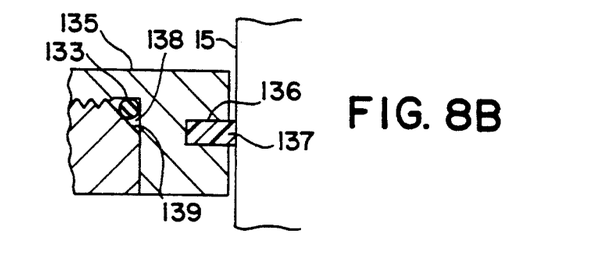
FIG. 8B is a vertical axial cross section of three piece seat assembly shown in FIG. 8A.

Referring to FIG. 8B, an alternative seat face member 135 which may replace seat face member 131 of FIG. 8A is shown. Seat face member 135 includes a groove 136 in which is mounted resilient face seal ring 137 of materials such as rubber, teflon or other elastomerics to create a resilient seal between seat face member 135 and gate 15 and seal 137. This embodiment does not require the machining tolerance necessary for metal-to-metal sealing and would be significantly less expensive in lower pressure applications, whether or not secondary seals are used.

As shown in FIGS. 1 and 9A, a seal support ring 31, forming the main body portion of the supplemental or secondary seal, is disposed around the exterior surface of extended tubular portion 30 (FIG. 1) or the ring-shaped seat face member 131 of the seat body member 128 (FIG. 9A). The seal support ring 31 is generally ring-shaped and has an inwardly relieved recess at its end toward the gate 15 such that the seal support ring 31 has an L-shaped configuration in cross section. The seal support ring 31 further includes a pair of extending portions 32, 33 which extend along the opposite sides of the gate 15 as best shown in FIG. 2. Each extending portion 32, 33 has a short cylindrical pin 34 fixed to a flat inwardly facing surface along the gate 15. The gate 15 further includes a camming edge 35 disposed along each of its sides. Each camming edge 35 has a vertical portion 35a at its lower end, above which is provided a slanted portion 35b. The pins 34 are engaged with the camming edge 35 in a cam and follower manner. When the gate 15 is moved downwardly toward a closed position by downward movement of the stem 14, the pins 34 move along the edge 35 from a position along portion 35a (not shown) toward a position along portion 35b to move the ring support element 31 toward the gate as shown in FIGS. 1 and 9A.

In U.S. Pat. No. 4,377,273, camming edges were provided by grooves 45 having front and back edges for closing and opening the secondary seal. As particularly shown in FIG. 1, and all other Figures except FIGS. 8A and 8B, and in U.S. Pat. No. 4,377,273, incorporated herein by reference as set out above, the secondary seal should be initially made up mechanically to cause the secondary seal 36a to sealingly engage the face of gate 15 (presuming flow is from flow passage 26 to flow passage 25). Thereafter, if there is any leakage around the metal-to-metal seal, the force from the pressure of the fluid in the body of the valve acting on seal means 36 to force the seal 36a into engagement with the gate face will be significantly greater than the force from the pressure of the fluid acting on seal means 36 to force the seal 36a out of the engagement with the gate face. Both of these forces will usually be significantly greater than the mechanical force of the spring member 40. It has been found, however, that the fluid pressure within the valve can be used to act to open the secondary seal, and that the back edge of the groove 45 shown in U.S. Pat. No. 4,377,273 may be eliminated, as shown in FIGS. 1, 3, 9A and 9B of the present disclosure.

Referring still to FIGS. 1 and 9A, a secondary seal member is provided which includes seal means 36 supported by the ring-shaped support element 31 such that movement of the seal support ring 31 forces the seal means 36 to engage the gate 15 to form a secondary seal.

The seal means 36 is comprised of a stepped annular ring having an inner recess 37 such that the seal means 36 is somewhat L-shaped in cross section. The seal means 36 may further include an annular resilient seal element 36a mounted to the seal means 36 by press fitting or other suitable means.

Figure 10:
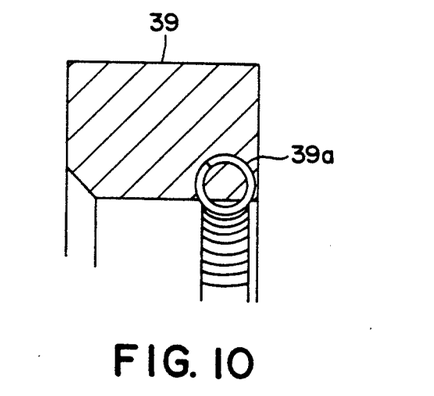
FIG. 10 is a cross section of an alternate seal.

The valve 10 further includes a means for deenergizing the secondary seal prior to substantial linear movement of the gate 15 across the fully energized seal means 36. In the embodiment illustrated in FIGS. 1 and 9A, the means for quickly deenergizing the secondary seal includes an energizing ring 38 slidably disposed within the inner recess 37 and a compressible, elastomeric seal ring 39 disposed between the energizing ring 38 and the seal means 36. The seal ring 39 may be comprised of any material having suitable compressible, elastomeric properties such that upon movement of the energizing ring 38 to compress the seal ring 39 when the secondary seal is effected, the seal ring 39 compresses and spreads outwardly to form a fluid tight, essentially incompressible seal. In an embodiment, the seal ring 39 is comprised of a compressible, elastomeric O-ring having a substantially circular cross-section. In the preferred embodiment of FIG. 10, the seal ring 39 is comprised of a compressible elastomeric ring which incorporates an anti-extrusion element 39a. At high operating pressures, elastomers tend to extrude through gaps, as is well known in the art. Accordingly, because seal ring 39 is an elastomer, it will tend to extrude. By placing a metal ring or other well known anti-extrusion element 39a at the corner of elastomer ring 39 as shown in FIG. 10, elastomer 39 will not be able to extrude past the ring 39a.

The preferred embodiment may further include a means for providing pressure relief for the seal means 36. In the illustrated embodiment of FIGS. 1 and 9A, the pressure relief means includes a spring member 40 disposed between the base of the seal support ring 31 and the energizing ring 38. The spring member 40 has a selected spring constant of a value selected such that once a seal between the seal means 36 and the gate 15 is effected, the spring member 40 will compress when a given force is exerted on the seal means 36 (and more specifically against seal ring 39 in FIGS. 1 and 9A) by pressurized fluid from the upstream side (or from the passageway 26 shown in FIGS. 1 and 9A). The compression of the spring 40, in turn, allows the seal means 36 to move away from the gate 15 on the upstream side in order to prevent destruction of the resilient seal element 36a.

It will be understood that the selection of a particular spring constant is dependent upon the materials comprising seal means 36, seal ring 39, and seal element 36a, and their ability to withstand a certain threshold pressure. Such selection is a matter of design which will be known to those of skill in the art in view of the present disclosure.

The spring member 40 may be comprised of a number of suitable springs providing the desired spring constant for a particular design of sealing means. In the preferred embodiment, the spring member 40 is comprised of a belleville spring having a suitable spring constant selected to yield at a desired level of pressure. It may also be an O-ring seal.

Figure 9B:
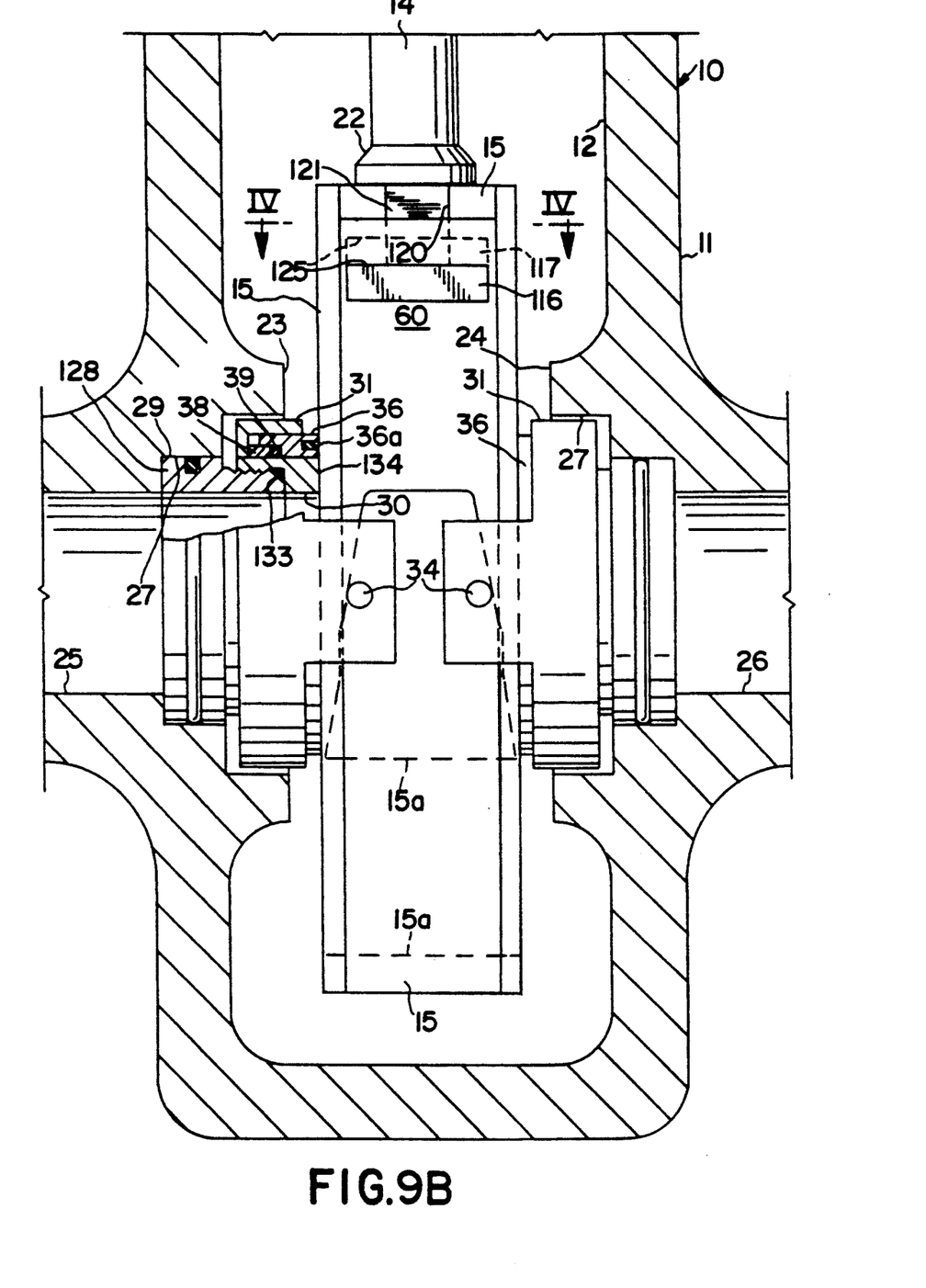
FIG. 9B is a vertical axial cross section illustrating an alternative preferred embodiment of the gate valve incorporating the caming wedge in accordance with the present invention.

Accordingly, the embodiments of the present invention illustrated in FIGS. 1, 9A, and 9B provide both a means for upstream pressure relief and a means for quickly deenergizing the seal 36.

The gate valve of the present invention may alternatively include a cooperating cam means which comprises a camming wedge slidably mounted along opposite sides of the gate such that movement of the wedge is effected prior to the movement of the gate upon the opening of the gate, whereby the secondary seal is deenergized prior to movement of the gate across the seal. Referring to FIGS. 3-6 and 9B, in which like members to FIGS. 1 and 9A are given like reference numerals, the preferred embodiment of a gate valve incorporating such a camming wedge is shown. In the description of the embodiment shown in FIGS. 3-6 and 9B, the terms "vertical" and "horizontal" are used in reference to a valve having the orientation shown in FIGS. 3 or 9B, wherein a valve is shown in the upright position with the stem extending upwardly out of the top of the valve.

Figure 5:
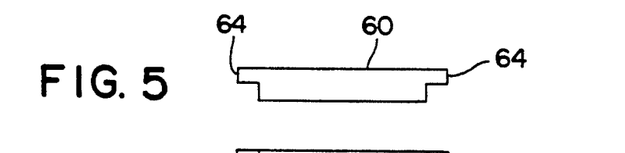
FIG. 5 is a plan view of a caming wedge constructed in accordance with the present invention.
Figure 6:
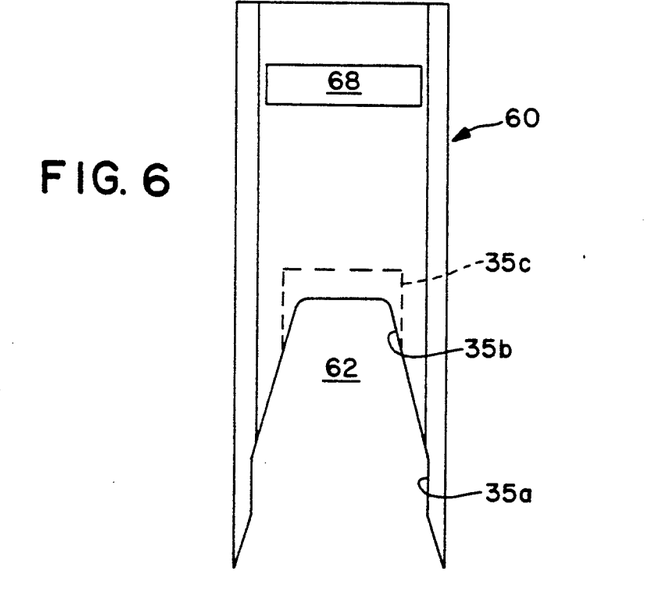
FIG. 6 is a side view of the caming wedge shown in FIG. 5.

Referring first to FIGS. 5 and 6, the camming wedge 60 has a generally rectangular configuration having a lower recess 62 extending therein. The recess 62 includes camming edges 35 which are essentially identical in function and similar in configuration to the camming edges 35 shown in FIGS. 1 and 9A. In particular, the camming edge 35 has a vertical portion 35a at its lower end and an upper slanted portion 35b. As described for FIGS. 1 and 9A, the camming edge 35 engages in use with the pins 34 in a cam and follower manner such that when the gate 15 is moved downwardly to a closed position by the downward movement of the stem 14, the pins 34 move along the edge 35 from a position along edge 35a toward a position along edge 35b to move the ring support element 31 toward the gate 15 to form the secondary seal.

Figure 4:
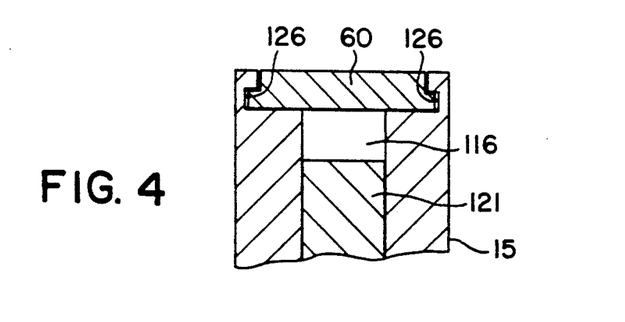
FIG. 4 is a horizontal cross section of the gate assembly taken at line IV—IV of either FIGS. 3 or 9B.

The wedge 60 also includes a pair of opposing tabs 64 extending outwardly from either side to engage within mating channels 126 in the gate 15 such that the gate 15 slidably supports the wedge 60 for longitudinal movement as shown in FIGS. 3, 9B and 4. The wedge 60 additionally comprises a horizontal slot 68 having a generally rectangular configuration in cross-section. As will be explained in greater detail below, the horizontal slot 68 is configured to fit onto the lower portion of the stem 14 such that play between the wedge 60 and the stem 14 in the vertical direction is minimized.

Referring to FIGS. 3 and 9B, the lower portion of the stem 14 includes a longitudinal section 121 having a rectangular configuration in horizontal cross-section. A transverse member 116, also having rectangular sides and bottom, is secured to the longitudinal section 121 such that the two members are configured in the form of an inverted block T. As shown in FIGS. 3 and 9B, in the preferred embodiment, the horizontal width of the transverse member 116 is greater than the horizontal width of the longitudinal member 121, but less than the corresponding width of the gate 15. Further, the horizontal length of the transverse section 116 is greater than the horizontal length of the longitudinal member 121, but substantially equal to the corresponding horizontal length of the gate 15. As shown in FIGS. 3 and 9B, the transverse section 116 is configured at each end to be slidably received within the horizontal slot 68 of the wedge 60 such that freedom of play between the wedge 60 and the horizontal slot 68 in the vertical direction is minimized.

The gate 15 includes a longitudinal slot 120 (FIGS. 3 and 9B) adapted to slidably receive the longitudinal section 121 and a transverse slot 117 adapted to slidably receive the transverse section 116. The longitudinal slot 120 is configured such that it slidably receives the longitudinal section 121 and provides limited freedom of latitudinal movement of the gate 15 in relation to the stem 14. The transverse slot 117 has a greater vertical dimension than the transverse section 116 such that a selected length 125 of vertical movement of the stem 14 is provided without corresponding movement of the gate 15.

For purposes of assembly, it should be understood that in the illustrated embodiment, the horizontal cross-sectional width of the longitudinal section 121 is not critical so long as a width is selected to provide suitable strength for the load expectations on the stem 14. Similarly, the horizontal cross-sectional length of the section 121 is not critical, but must be sufficiently less than the horizontal cross-sectional length of the gate 15 to accommodate the sliding of the stem 114 to one side of the gate 15 to accommodate installation of the wedges 60. This clearance is best illustrated in FIG. 4. It will be appreciated that other configurations of the stem 14, wedge 60, and gate 15 may be utilized to accommodate assembly of the three members in accordance with the present invention.

Accordingly, when the valve 10 is in a closed position, as shown in FIGS. 3 and 9B, the secondary seal has been effected by the downward movement of the camming wedge 60. When it is desired to open the valve, the upward movement of the stem 14 for the selected distance 125 will raise the camming wedge 60 without a corresponding movement of the gate 15. This "lost motion" allows the camming wedge 60 to substantially release the secondary seal before any upward movement of the gate 15 is provided.

In this regard, it should be noticed that upon the movement of the gate 15 downwardly to close the valve, the drag of the primary seal upon the gate 15 will cause the gate 15 to seek the highest position as shown in FIGS. 3 and 9B. Alternatively, lower stops could be provided for the gate 15 whereby the gate "bottoms out" against such a stop to insure that the freedom for lost motion is provided upon the upward movement of the stem 14.

Referring again to FIG. 6, an alternative design for the camming edges 35 shown in FIGS. 1, 3, 9A, and 9B is disclosed which provides a means for limiting the force with which the secondary seal is effected. In particular, the camming edges 35 may be configured to include an upper vertical portion 35c (shown ghosted). The vertical portion 35c is disposed substantially parallel to the side of the gate 15 in use such that the engagement of the follower pin 34 with the edge 35c will cease movement of the ring shaped support element 31 toward the gate 15 and will thereby cease further tightening of the secondary seal.

Figure 7:
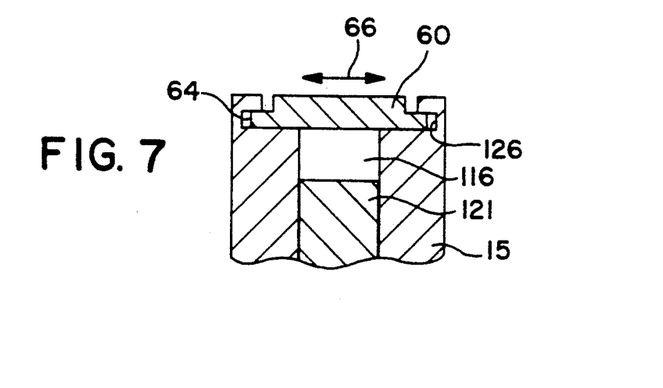
FIG. 7 is a horizontal cross section of the gate assembly taken along line IV—IV of FIGS. 3 or 9B, illustrating an alternative embodiment of the caming wedge adapted for evenly applying secondary seals.

Referring now to FIG. 7, there is shown an alternative embodiment of the camming wedge 60 of FIGS. 5-6 adapted to center the gate 15 between opposing secondary seals such that the secondary seals are evenly applied. As shown in FIG. 7, the wedge 60 may have the same basic configuration in horizontal cross-section as the wedge 60 shown in FIG. 4. In the embodiment shown in FIG. 7, however, the wedge 60 is of a dimension such that when the wedge 60 is mounted onto the gate 15, clearance is provided between the tabs 64 and the bottom of the mating channels 126 and between the wedge 60 and the gate 15 in order to allow latitudinal movement of the wedge 60 in relation to the gate 15 as shown by the arrow 66.

Accordingly, when wedges having clearance for such latitudinal movement are mounted to the gate 15 as shown in FIG. 7, the wedges float to compensate for misalignment of the gate between opposing secondary seals and insure that the seals are evenly applied to the opposing sides of the gate 15.

Figure 11:
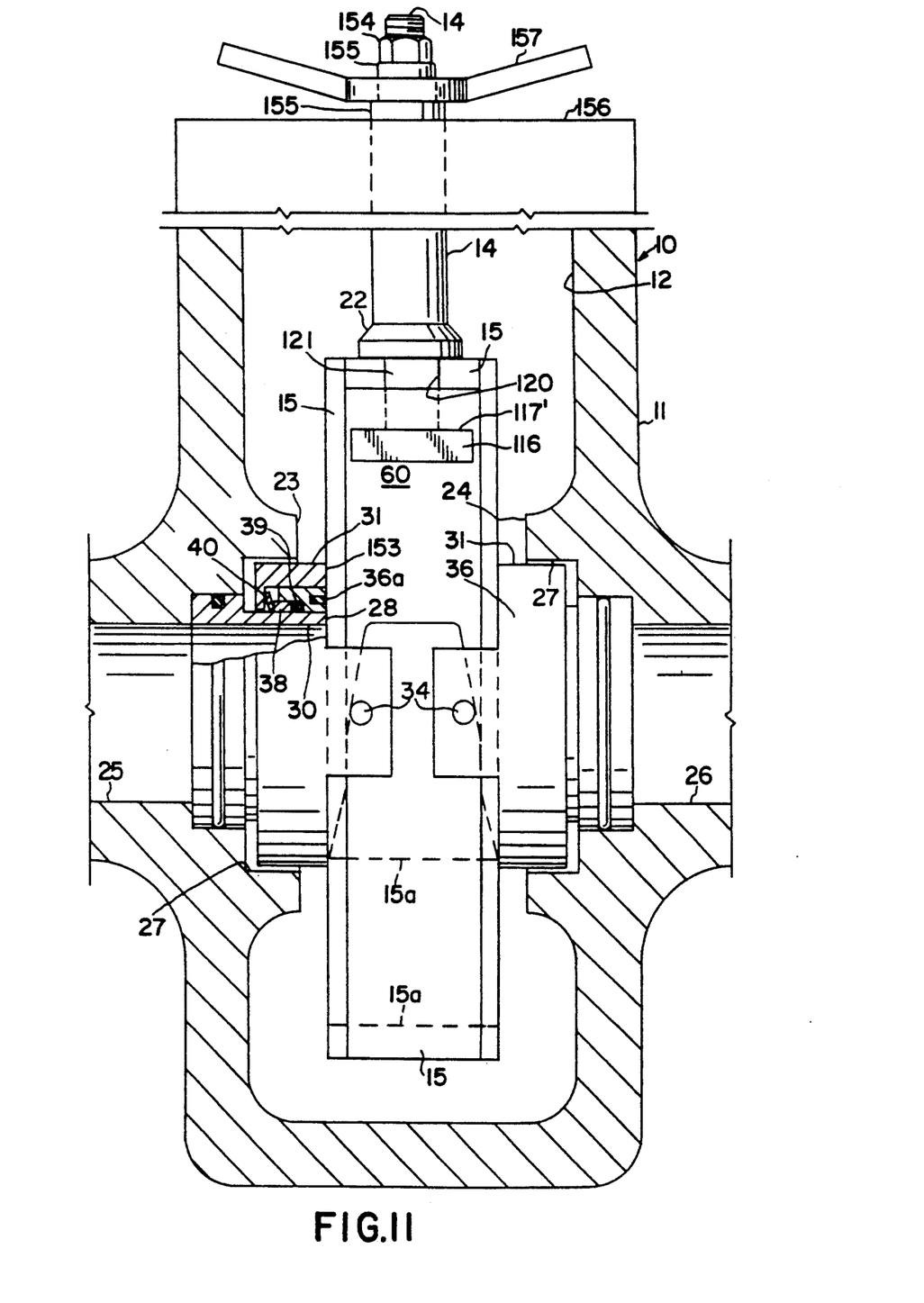
FIG. 11 is a vertical axial cross section illustrating the preferred embodiment of a gate valve constructed with a wedge having no lost motion and spring relief in accordance with the present invention.

Referring to FIG. 11, the preferred embodiment of use of a wedge 116 without space 125 of FIGS. 3 and 9B and with the spring 40 of FIGS. 1 and 9A is shown. The lack of space 125 yields a transverse slot 117' substantially as wide as wedge 116. Additionally, this embodiment may have the multi-piece seat 128 of FIGS. 8A, 8B, 9A and 9B. In addition, as seen in FIG. 11, the yoke includes a preferred method of limiting tightening of the secondary seal by compression of spring 40. The inward travel of seal support ring 31 toward gate 15 is limited to prevent compressing spring 40 solid. The limitation of the travel of seal support ring 31 is accomplished by inner face 153 of seal support ring 31 abutting gate 15. The seal support ring 31 is then prevented from scouring the face of gate 15 by stopping any further downward movement of the gate 15 after seal support ring face 153 contacts the gate 15. Downward movement of the gate is limited by stopping the downward movement of stem 14. Limitation of the downward movement of the stem 14 is accomplished by supplying a stop nut 154 on the outer end of stem 14 and adjusting stop nut 154 to stop on a stem nut 155 located between bonnet 156 and handle 157. The adjustment of stop nut 154 to a position where it stops against stem nut 155 should coincide with the abutting of seal support ring surface 153 with the face of gate 15. Limiting the downward movement of the stem 14 also prevents overstressing camming wedge 60, seal support ring 31, gate 15, and stem 14.

Figure 9C:
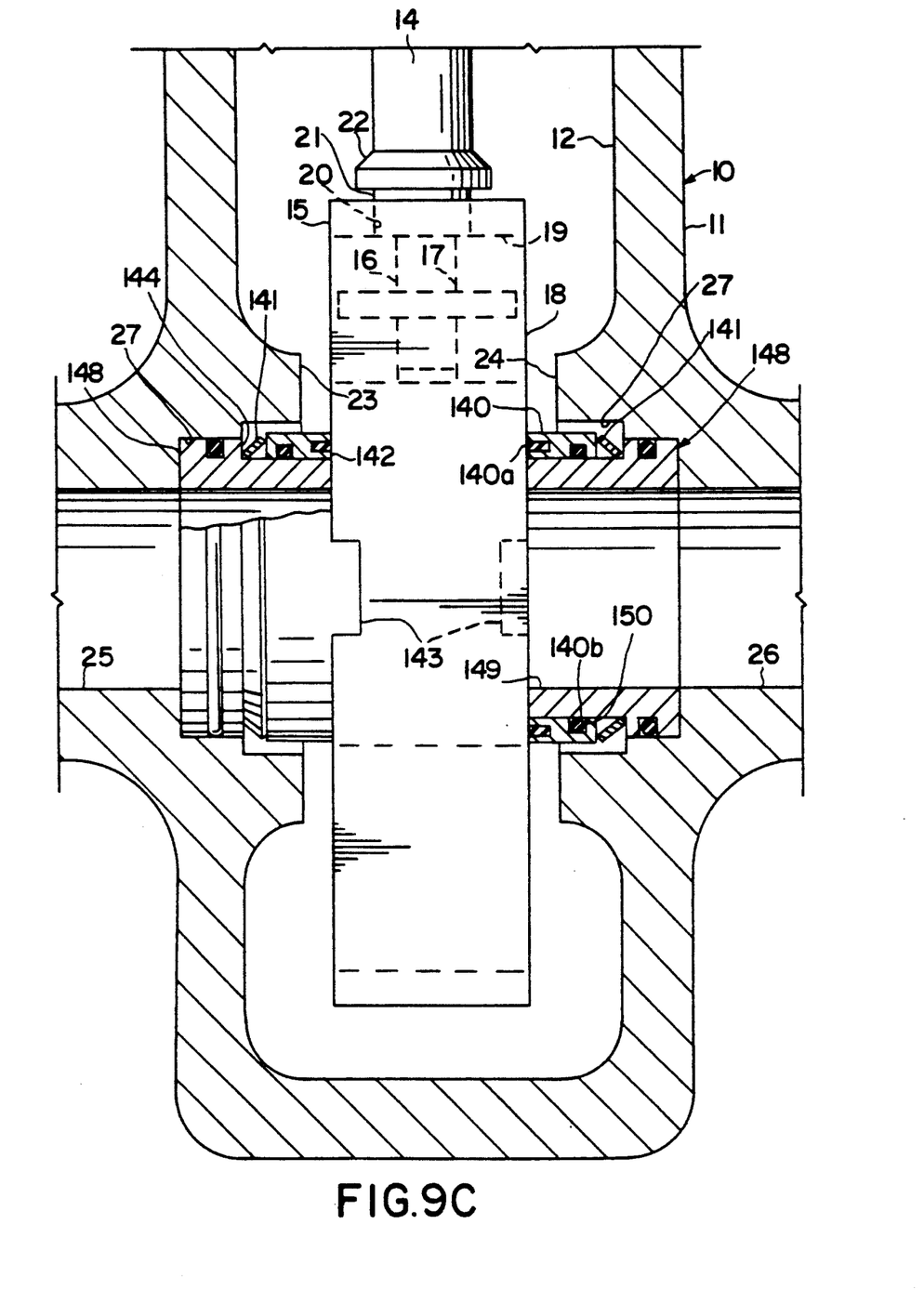
FIG. 9C is a vertical axial cross section illustrating an alternative preferred embodiment of the gate valve incorporating a simplified secondary sealingly assembly.

Referring to FIG. 9C, for an alternate secondary seal, seat body member 148 includes tubular portion 149 to slidingly engage ring shaped secondary seal member 140. Secondary seal member 140 includes an annular ring body having an annular resilient element 140a mounted to the inward facing surface 142 of the body of secondary seal member 140 by press fitting or other suitable seal means. Secondary seal member 140 further includes an O-ring, "T" ring or other suitable seal ring 140b received in a groove 150 of the body adapted to sealingly engage the outward facing surface of tubular member 149. In the illustrated embodiment of FIG. 9C, the secondary seal means includes a spring member 141 disposed between secondary seal member 140 and the shoulder 144 on seat body member 148. Alternately, an annular ring extension 152 (FIG. 9D) may be a part of seat body members 148 to form a pocket 145 for the spring 141. Spring member 141 maintains the contact between the secondary seal means and the gate 15 at surface 142. The spring member 141 will compress when a given force is exerted on the secondary seal means by pressurized fluid from the upstream side allowing the secondary seal means to move away from the gate 15 on the upstream side in order to prevent destruction of the resilient seal element 140a on the upstream side.

Figure 9D:
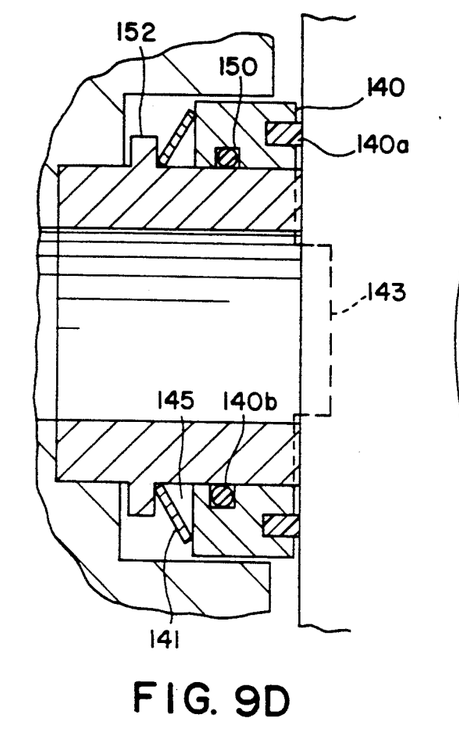
FIG. 9D is a vertical cross section of the simplified secondary seal assembly used in FIG. 9C.
Figure 9E:
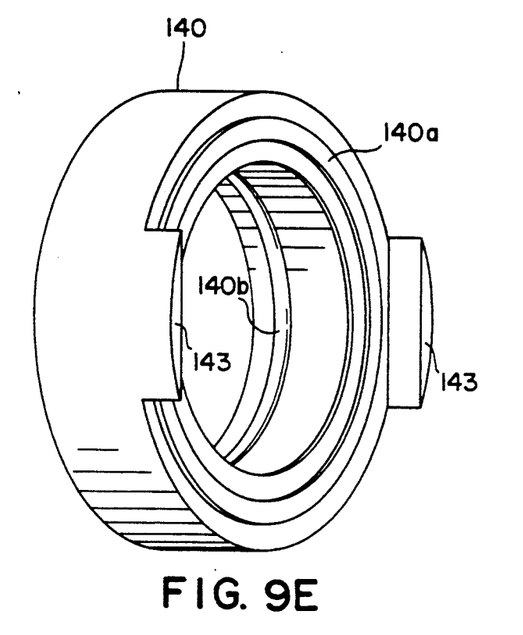
FIG. 9E is a perspective view of the valve seat having gate guides.

In the preferred embodiment of FIG. 9C, seat member 140 incorporates gate guides 143 which extend along opposite sides of the gate 15 as best shown on FIGS. 9D and 9E.

The spring 141 may be made of a belleville spring, elastomeric "O"-ring or other suitable material.

Referring to FIG. 9C, fluid flowing from passage 26, if flow port 15a were aligned with passages 25, 26, would cause fluid to flow from passage 26 to passage 25, rendering passage 26 to be the upstream side of valve 10 and passage 25 to be the downstream side of valve 10, as is well known in the art of gate valves. The upstream pressure of the upstream fluid on the upstream side, i.e. in upstream passage 26, especially when flow port 15a is not aligned would inherently act on the upstream secondary seal differential annular area ("Area") consisting of the difference between (1) the area having a diameter of the outside of annular resilient element 140a and (2) the area having a diameter of the inside of seal ring 140b. The force of this pressure on the Area would act to force the secondary seal 140 away from gate 15, when this force exceeds the load created by spring 141. The line fluid would then enter the valve body chamber 12. Thus, as inherent in the design shown in FIG. 9C, the upstream secondary seal 140 is a "pressure deenergized" seal; i.e. the fluid pressure acts to urge the seal away from the gate.

Equally inherent in the design shown in FIG. 9C, the downstream secondary seal 142 is a "pressure energized" seal; i.e. the pressure acts to urge the seal towards the gate. The fluid in the valve body chamber 12 acts on the downstream secondary seal 142, with the force of the pressure in valve body chamber 12 acting on the corresponding downstream annular area to that of the upstream annular area identified above as the Area. The upstream and downstream annular areas are substantially equal as shown in FIG. 9C. Thus pressure in the valve body chamber 12 inherently acts on the downstream secondary seal forcing the secondary seal towards gate 15. However, if there is fluid in downstream passage 25, this fluid would act on secondary seal 142 in the same manner as the fluid in upstream passage 26 acts on secondary seal 140. Thus, the force acting to make up secondary seal 142 is directly proportional to the difference between (1) the pressure in the valve body chamber 12 (and hence in most cases substantially the pressure in the upstream passage 26) and (2) the pressure in the downstream passage 25, such differential pressure acting on the Area because the upstream and downstream annular areas are substantially equal as shown in FIG. 9C. Accordingly, the higher the differential pressure, the greater the force acting to urge secondary seal 142 against the gate.

The instant invention has been disclosed in connection with specific embodiments. However it will be apparent to those skilled in the art that variations from the illustrated embodiments may be undertaken without departing from the spirit and scope of the invention. For example, the camming wedge 60 of FIG. 7 could further be incorporated into the embodiment shown in FIGS. 1 and 9A, without the provision for lost motion between the gate and the stem upon the opening of the valve. Additionally, the pressure release means or spring member could be incorporated into the embodiment shown in FIGS. 3 and 9B to insure that the seal means 36 would yield when a selected pressure level was reached upstream. Also the split seat mechanism could be incorporated into the embodiments of FIG. 9C. Further, the secondary seal and split seat mechanisms may be used in other types of valves, such as plug, ball and butterfly valves.

Accordingly, because many varying and different embodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A gate valve subject to fluid pressure from fluid under pressure passing through the valve, the fluid under pressure originating from an upstream flow line connected to the valve, comprising:
   (a) a valve body having a valve chamber therein and a pair of flow passages aligned at opposite sides of the valve chamber, and additionally having a recess around the inner end of each of the aligned flow passages;
   (b) a gate member having an imperforate section and a section having a flow passage therethrough, the gate member being disposed within the valve chamber and being reciprocally movable along a line substantially transverse to the valve chamber flow passages, between a gate position in which the valve is open and the flow passage of the gate member aligns with the valve chamber flow passages and a gate position in which the valve is closed and the imperforate section aligns with the valve chamber flow passages;
   (c) a valve seat in each of the recesses around the inner end of the flow passages, each of the valve seats comprising a ring shaped seat between which the gate member slides between the open and closed position such that the gate forms a primary seal with only one of the ring shaped seats when the gate is in the valve closed position;
   (d) a seal support ring slidably disposed around the outside of the ring shaped seat forming the only primary seal with the gate, the seal support ring having an inner recess therearound at the end adjacent the gate;
   (e) an elastomeric seal member disposed in the inner recess of the seal support ring;
   (f) a spring member having selected spring value to provide initial contact of the elastomeric seal member against the gate;
   (g) responsive means responsive to fluid pressure for providing sealing engagement force of said elastomeric seal member against said gate to form a secondary seal, whereby the secondary seal is pressure enhanced on the side of the gate where the primary seal is formed;
   (h) after the primary seal is formed, the responsive means acts to form the secondary seal, whereby the primary seal acts to protect the secondary seal from wear; and
   (i) the responsive means includes means to provide engagement force commensurate with the fluid pressure, whereby the secondary seal acts to maintain a sealing engagement with the gate only if the primary seal leaks.

2. The gate valve of claim 1, wherein the ring shaped seat that forms the primary seal with the gate is the downstream seat.

3. The gate valve of claim 2 wherein there is further included an upstream seal support ring slidably disposed around the outside of the upstream ring shaped seat, the upstream seal support ring having a second inner recess therearound at the end adjacent the gate and wherein there is further included a second elastomeric seal member disposed in the inner recess of the upstream seal support ring responsive to fluid pressure to relieve fluid pressure on the upstream side into the valve body at a predetermined upstream pressure.

4. The gate valve of claim 1, wherein the responsive means includes a second elastomeric seal.

5. The gate valve of claim 4, wherein the second elastomeric seal includes:
(g) a second recess on the seal support ring surrounding the ring shaped seat that forms the primary seal with the gate;
(h) a second elastomeric seal member disposed in the second recess.

6. The gate valve of claim 5, wherein the second recess is located on the inside of the seal support ring facing the ring shaped seat.

7. The gate valve of claim 1, wherein there is a second seal support ring slidably disposed around the outside of the ring shaped seat that does not form a primary seal with the gate, the second seal support ring having a second inner recess therearound at the end adjacent the gate and wherein there is further included a second elastomeric seal member disposed in the inner recess of the second seal support ring responsive to fluid pressure to relieve fluid pressure into the valve body.

8. The gate valve of claim 7, wherein there is further included a second spring member having a selected spring value to provide initial contact of the second elastomeric seal member against the gate and to provide pressure relief from the flow passage to the valve body.

9. The gate valve of claim 1, wherein the responsive means includes a second seal member sealing between the seal support ring and the ring shaped seat that forms the primary seal with the gate.

10. The valve of claim 1 in which the spring member is a belleville spring.

11. The valve of claim 1, wherein the seal support ring includes a second elastomeric seal sealing between the seal support ring and the valve seat.

12. The valve of claim 1, wherein the ring shaped seat that forms the primary seal with the gate includes a ring shaped extension and the spring member is positioned between the seal support ring and the ring shaped extension.

13. The valve of claim 1, wherein there is further included means for admitting fluid into the valve body from the side of the gate opposite to the side of the gate forming the primary seal with one of the valve seats.

* * * * *